(12) United States Patent
Zhu et al.

(10) Patent No.: US 9,251,837 B2
(45) Date of Patent: Feb. 2, 2016

(54) HAMR NFT MATERIALS WITH IMPROVED THERMAL STABILITY

(71) Applicant: SEAGATE TECHNOLOGY LLC, Cupertino, CA (US)

(72) Inventors: Meng Zhu, Bloomington, MN (US); Tong Zhao, Eden Prairie, MN (US); Steven C. Riemer, Minneapolis, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/795,643

(22) Filed: Mar. 12, 2013

(65) Prior Publication Data

US 2013/0286799 A1    Oct. 31, 2013

Related U.S. Application Data

(60) Provisional application No. 61/637,979, filed on Apr. 25, 2012.

(51) Int. Cl.
| | | |
|---|---|---|
| *G11B 13/08* | (2006.01) | |
| *G11B 5/60* | (2006.01) | |
| *G11B 5/00* | (2006.01) | |

(52) U.S. Cl.
CPC .............. *G11B 13/08* (2013.01); *G11B 5/6088* (2013.01); *G11B 2005/0021* (2013.01)

(58) Field of Classification Search
USPC ......... 369/13.02, 13.13, 13.32, 13.33; 360/59
See application file for complete search history.

(56) References Cited

U.S. PATENT DOCUMENTS

| | | | |
|---|---|---|---|
| 4,492,873 | A | 1/1985 | Dmitriev |
| 5,482,611 | A | 1/1996 | Helmer |

(Continued)

FOREIGN PATENT DOCUMENTS

| | | |
|---|---|---|
| EP | 024088 | 10/1987 |
| EP | 0 580 368 A2 | 1/1994 |

(Continued)

OTHER PUBLICATIONS

Bannuru et al., "The Electrical and Mechanical Properties of Au—V and Au—V2O5 Thin Films for Wear-Resistant RF MEMS Switches", Journal of Applied Physics, 103, (2008), pp. 083522-1-083522-6.

(Continued)

*Primary Examiner* — Brenda Bernardi
(74) *Attorney, Agent, or Firm* — Mueting, Raasch & Gebhardt, P.A.

(57) ABSTRACT

An apparatus that includes a near field transducer, the near field transducer including silver (Ag) and at least one other element or compound, wherein the at least one other element or compound is selected from: copper (Cu), palladium (Pd), gold (Au), zirconium (Zr), zirconium oxide (ZrO), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof.

10 Claims, 8 Drawing Sheets

(56) References Cited

U.S. PATENT DOCUMENTS

| | | | |
|---|---|---|---|
| 5,849,093 A | 12/1998 | Andra | |
| 5,945,681 A | 8/1999 | Tokiguchi | |
| 6,130,436 A | 10/2000 | Renau | |
| 6,144,098 A | 11/2000 | Iyer | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,795,630 B2 | 9/2004 | Challener | |
| 6,999,384 B2 * | 2/2006 | Stancil et al. | 369/13.32 |
| 7,002,228 B2 | 2/2006 | Deak | |
| 7,018,729 B2 | 3/2006 | Pocker | |
| 7,032,427 B2 * | 4/2006 | Niwa et al. | 72/325 |
| 7,262,936 B2 | 8/2007 | Hamann | |
| 7,272,079 B2 | 9/2007 | Challener | |
| 7,330,404 B2 | 2/2008 | Peng | |
| 7,377,228 B2 | 5/2008 | Mack | |
| 7,476,855 B2 | 1/2009 | Huang | |
| 7,544,958 B2 | 6/2009 | Low | |
| 7,609,003 B2 | 10/2009 | Horsky | |
| 7,690,009 B2 | 3/2010 | Miyanishi | |
| 7,791,839 B2 | 9/2010 | Olson | |
| 7,961,417 B2 * | 6/2011 | Seigler et al. | 360/59 |
| 7,965,464 B2 | 6/2011 | Batra | |
| 7,986,592 B2 | 7/2011 | Hirano | |
| 8,023,225 B2 | 9/2011 | Shimazawa | |
| 8,031,561 B2 | 10/2011 | Hellwing | |
| 8,040,761 B2 | 10/2011 | Kawamori | |
| 8,077,556 B2 * | 12/2011 | Komura et al. | 369/13.02 |
| 8,107,325 B2 | 1/2012 | Komura | |
| 8,116,034 B2 | 2/2012 | Komura | |
| 8,116,176 B2 | 2/2012 | Kato | |
| 8,194,510 B2 | 6/2012 | Sasaki | |
| 8,194,511 B2 | 6/2012 | Sasaki | |
| 8,213,272 B2 | 7/2012 | Takayama | |
| 8,223,597 B2 | 7/2012 | Komura | |
| 8,248,891 B2 | 8/2012 | Lee | |
| 8,284,521 B2 | 10/2012 | Ohtsu | |
| 8,284,635 B2 | 10/2012 | Matsumoto | |
| 8,289,650 B2 | 10/2012 | Seigler | |
| 8,320,220 B1 | 11/2012 | Yuan | |
| 8,325,567 B2 | 12/2012 | Miyauchi | |
| 8,331,205 B2 | 12/2012 | Seigler | |
| 8,339,740 B2 | 12/2012 | Zou | |
| 8,351,151 B2 | 1/2013 | Katine | |
| 8,385,159 B2 | 2/2013 | Gao | |
| 8,400,902 B2 | 3/2013 | Huang | |
| 8,405,056 B2 | 3/2013 | Amaldi | |
| 8,405,932 B2 | 3/2013 | Seigler | |
| 8,416,647 B1 | 4/2013 | Zhao | |
| 8,427,925 B2 | 4/2013 | Zhao | |
| 8,451,555 B2 | 5/2013 | Seigler | |
| 8,477,454 B2 | 7/2013 | Zou | |
| 8,514,673 B1 * | 8/2013 | Zhao et al. | 369/13.33 |
| 8,553,505 B2 | 10/2013 | Rawat | |
| 8,670,215 B2 | 3/2014 | Zou | |
| 8,675,457 B1 | 3/2014 | Hirata | |
| 8,711,662 B2 | 4/2014 | Lee | |
| 8,733,959 B2 | 5/2014 | Moriya | |
| 8,830,800 B1 | 9/2014 | Pitcher | |
| 8,917,581 B1 | 12/2014 | Mallary | |
| 8,934,198 B2 | 1/2015 | Zou | |
| 2005/0012052 A1 | 1/2005 | Platzgummer | |
| 2005/0190496 A1 | 9/2005 | Hamann | |
| 2006/0238133 A1 | 10/2006 | Horsky | |
| 2007/0069383 A1 | 3/2007 | Suzuki | |
| 2008/0230724 A1 | 9/2008 | Low | |
| 2009/0073858 A1 | 3/2009 | Seigler | |
| 2009/0130365 A1 * | 5/2009 | Kojima et al. | 428/64.4 |
| 2009/0225636 A1 | 9/2009 | Hirano | |
| 2010/0103553 A1 * | 4/2010 | Shimazawa et al. | 360/59 |
| 2010/0123965 A1 | 5/2010 | Lee | |
| 2010/0123967 A1 | 5/2010 | Batra | |
| 2010/0128579 A1 | 5/2010 | Seigler | |
| 2010/0149930 A1 * | 6/2010 | Komura et al. | 369/13.33 |
| 2010/0157746 A1 | 6/2010 | Hongo | |
| 2010/0190036 A1 | 7/2010 | Komvopoulos | |
| 2010/0214685 A1 | 8/2010 | Seigler | |
| 2010/0309581 A1 | 12/2010 | Wu | |
| 2010/0315736 A1 | 12/2010 | Takayama | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0038236 A1 | 2/2011 | Mizuno | |
| 2011/0058272 A1 | 3/2011 | Miyauchi | |
| 2011/0096431 A1 | 4/2011 | Hellwig | |
| 2011/0122735 A1 * | 5/2011 | Kato et al. | 369/13.14 |
| 2011/0205863 A1 * | 8/2011 | Zhao et al. | 369/13.33 |
| 2012/0045662 A1 | 2/2012 | Zou | |
| 2012/0105996 A1 | 5/2012 | Katine | |
| 2012/0127839 A1 | 5/2012 | Rawat | |
| 2012/0213042 A1 | 8/2012 | Aoki | |
| 2013/0107679 A1 * | 5/2013 | Huang et al. | 369/13.32 |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0235707 A1 * | 9/2013 | Zhao et al. | 369/13.29 |
| 2013/0279315 A1 | 10/2013 | Zhao | |
| 2013/0286799 A1 | 10/2013 | Zhu | |
| 2013/0286804 A1 | 10/2013 | Zhao | |
| 2013/0288077 A1 | 10/2013 | Dhawan | |
| 2014/0004384 A1 | 1/2014 | Zhao | |
| 2014/0043948 A1 | 2/2014 | Hirata | |
| 2014/0050057 A1 | 2/2014 | Zou | |
| 2014/0113160 A1 | 4/2014 | Pitcher | |
| 2015/0132503 A1 | 5/2015 | Kautzky | |

FOREIGN PATENT DOCUMENTS

| | | |
|---|---|---|
| EP | 0942072 | 9/1999 |
| EP | 1328027 | 7/2003 |
| EP | 2106678 | 10/2009 |
| JP | 2011198450 | 10/2011 |
| JP | 20111238991 | 12/2011 |
| TW | 200929183 | 7/2009 |
| WO | WO 97/45834 | 12/1997 |
| WO | WO 2013/163195 | 10/2013 |
| WO | WO 2013/163470 | 10/2013 |

OTHER PUBLICATIONS

Williams et al., "Strengthening Gold Thin Films with Zirconia Nanoparticles for MEMS Electrical Contacts", Acta Materialia 56, (2008), pp. 1813-1819.

PCT/US2013/038120 Search Report and Written Opinion dated Jul. 19, 2013, pgs. (8 pgs.).

U.S. Appl. No. 13/923,925, filed Jun. 21, 2013, Pitcher.

U.S. Appl. No. 14/062,651, filed Oct. 24, 2013, Zou.

Al-Bayati et al., Junction Profiles of Sub keV Ion Implantation for Deep Sub-Quarter Micron Devices, *IEEE*, 2000, pp. 87-90.

Angel et al., "Enhanced Low Energy Drift-Mode Beam Currents in a High Current Ion Implanter," *IEEE*, 1999, pp. 219-222.

Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

Metallization: "Metallization"; chapter 5, In: *Kris v. Srikrishnan and Geraldine C. Schwartz*: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," *Materials Science and Engineering R 37*, 2002, pp. 129-281.

(56) References Cited

OTHER PUBLICATIONS

Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

International Preliminary Report on Patentability for PCT/US2013/038120, dated Nov. 6, 2014 (6 pages).

\* cited by examiner

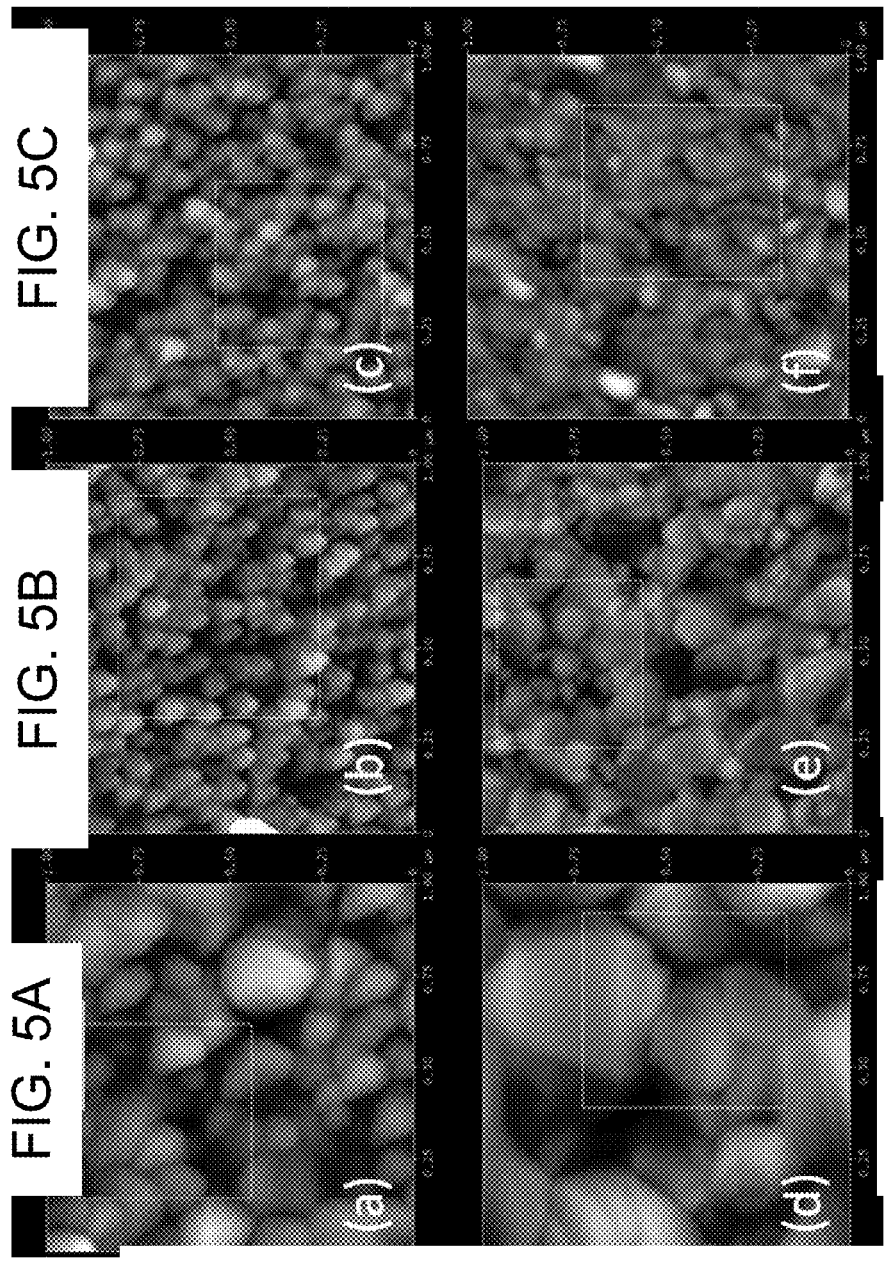

HAMR NFT MATERIALS WITH IMPROVED THERMAL STABILITY

PRIORITY

This application claims priority to U.S. Provisional Application No. 61/637,979 entitled "NEAR FIELD TRANSDUCERS (NFTs) INCLUDING SILVER ALLOYS" filed on Apr. 25, 2012, the disclosure of which is incorporated herein by reference thereto.

BACKGROUND

In heat assisted magnetic recording (HAMR), information bits are recorded on a data storage medium at elevated temperatures. The data bit dimension can be determined by the dimensions of the heated area in the storage medium or the dimensions of an area of the storage medium that is subjected to a magnetic field. In one approach, a beam of light is condensed to a small optical spot on the storage medium to heat a portion of the medium and reduce the magnetic coercivity of the heated portion. Data is then written to the reduced coercivity region.

One example of a recording head for use in heat assisted magnetic recording includes a near field transducer (NFT) that is capable of focusing light to a spot size smaller than the diffraction limit. The NFT is designed to reach local surface-plasmon resonance at a designed light wavelength. At resonance, a high electric field surrounding the NFT appears, due to the collective oscillation of electrons in the metal. A portion of the field will tunnel into a storage medium and get absorbed, raising the temperature of the medium locally for recording.

The NFT's temperature significantly increases at plasmonic resonance. In addition, a portion of the NFT may be exposed at the air bearing surface of the recording head and is thus subject to mechanical wearing. NFT performance is greatly influenced by the heat and mechanical stress during HAMR operation. It would therefore be advantageous to have NFT devices that are more durable.

SUMMARY

An apparatus that includes a near field transducer, the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof.

An apparatus that includes a light source; a waveguide; and a near field transducer, the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof, wherein the light source, waveguide and near field transducer are configured to transmit light from the light source to the waveguide and finally the near field transducer.

A disc drive that includes at least one actuator arm having a flexure; at least one head, wherein each flexure has a head at the distal end thereof and wherein each head includes: a light source; a near field transducer, the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof; a magnetic reader; and a magnetic writer, wherein the light source and the near field transducer are configured to transmit light from the light source to the near field transducer in order to assist the magnetic writer with writing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIGS. 5A to 5F are atomic force microscopy (AFM) images (1 μm×1 μm scans) of Ag and AgPd films, with FIG. 5A being an AFM image of an as-deposited Ag film; FIG. 5B an as-deposited AgPd (10.7 at % Pd) film; FIG. 5C an as-deposited AgPd (25 at %) film; FIG. 5D a Ag film after a 300° C. 15 minute rapid thermal annealing (RTA); FIG. 5E a AgPd (10.7 at %) film after a 300° C. 15 minute RTA; and FIG. 5F a AgPd (25 at %) film after a 300° C. 15 minute RTA.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
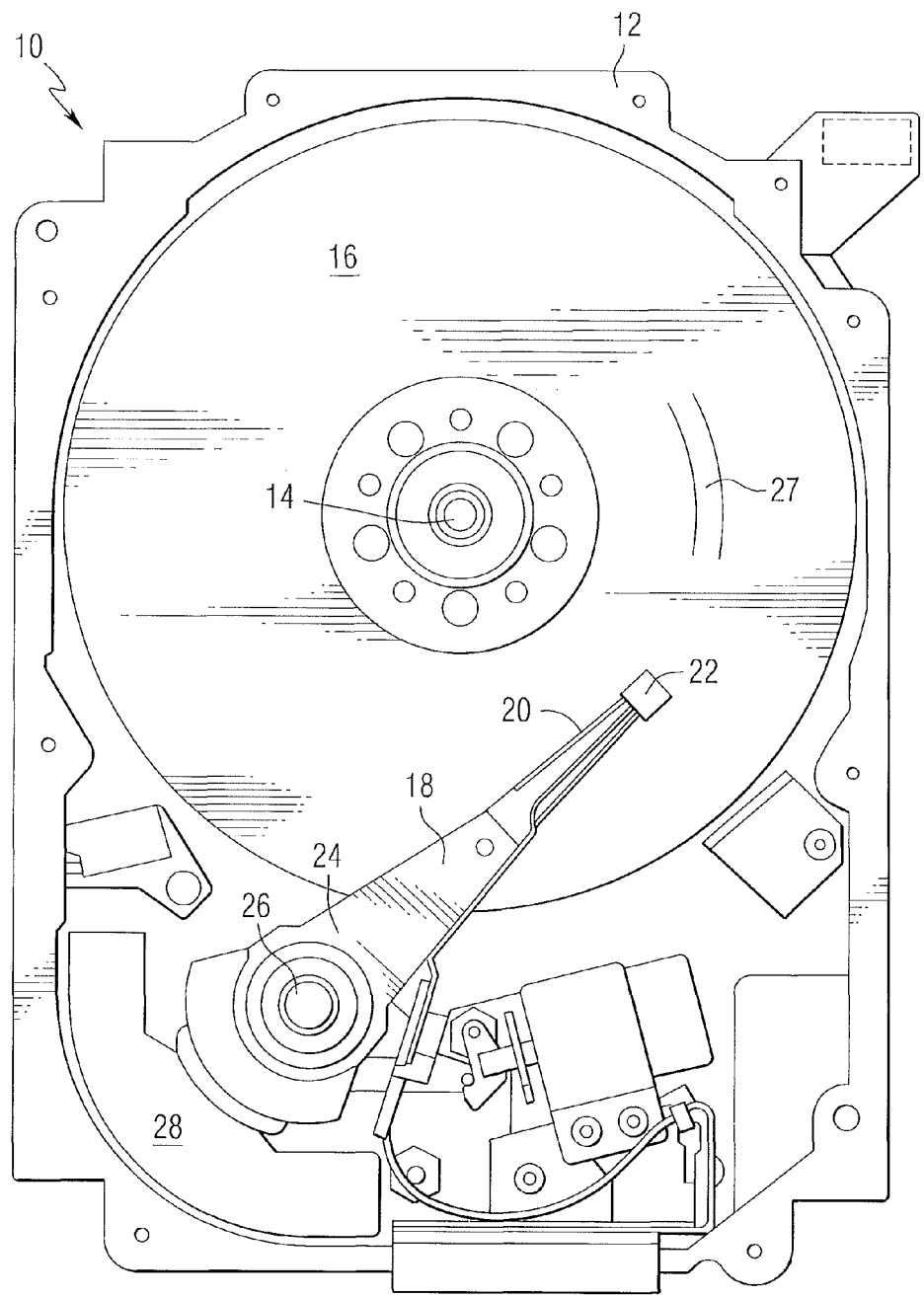
FIG. 1 is a pictorial representation of a data storage device in the form of a disc drive that can include a recording head constructed in accordance with an aspect of this disclosure.

Disclosed herein are NFTs and devices that include such NFTs. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, disclosed NFTs can be utilized in other devices that include a near field transducer.

Figure 2:
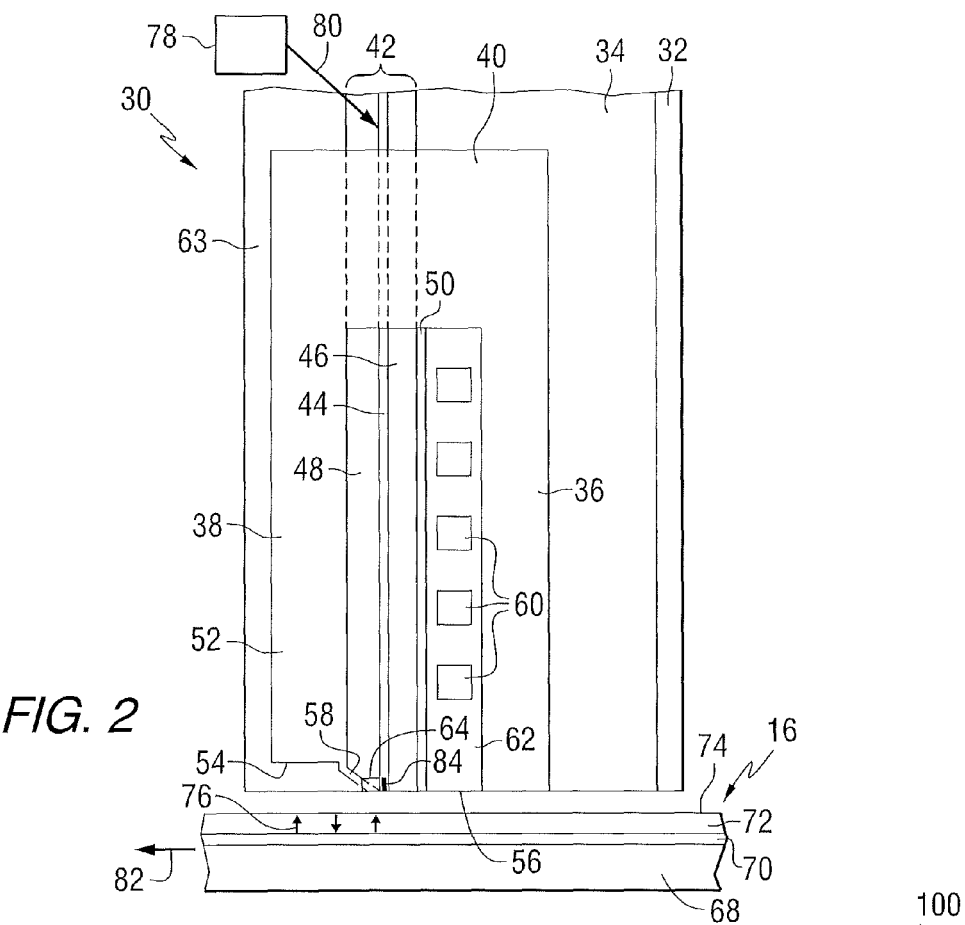
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
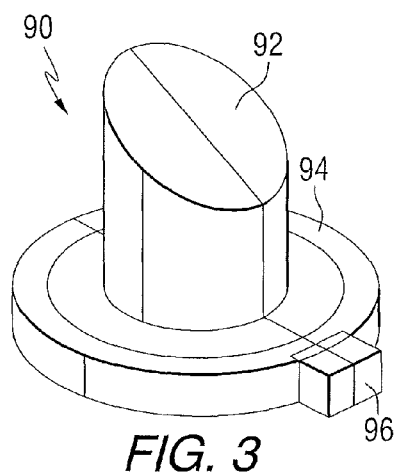
FIG. 3 is a schematic representation of a near field transducer.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus can be subjected to mechanical wearing.

Figure 4:
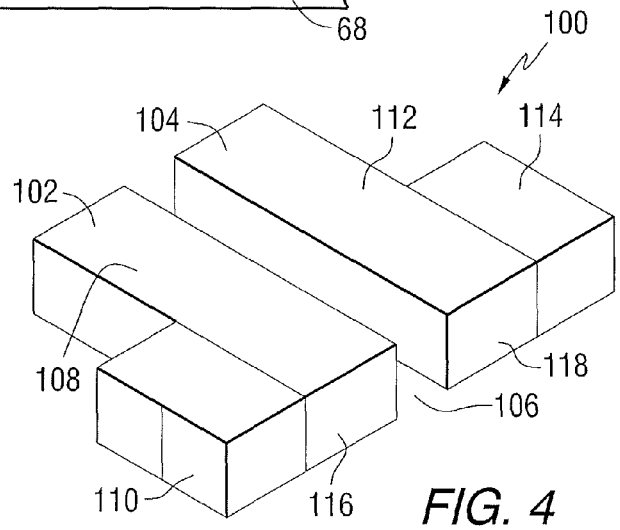
FIG. 4 is a schematic representation of another near field transducer.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing. FIGS. 3 and 4 show example NFTs. However, the disclosure is not limited to any particular type of NFT. The materials described below may be used in various NFT configurations.

In some embodiments, disclosed NFTs may include silver and at least one other element or compound. The at least one other element or compound can exist within an alloy of the silver, or can be within the silver but not in the form of an alloy, for example as a nanoparticle. In some embodiments, disclosed NFTs may include a silver (Ag) alloy. The use of silver alloys can be advantageous because pure silver has better optical properties than other plasmonic materials, for example gold (Au). This could allow for more aggressive methods of material engineering without obtaining a material with useless optical properties. Silver also has the advantage, with respect to gold, of costing less.

Useful silver alloys may include one or more than one (at least one) secondary element. Exemplary secondary elements can include, for example copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof. In some embodiments, a NFT can include a silver alloy that includes copper, palladium, or combinations thereof. In some embodiments, a NFT can include a silver alloy that includes palladium. In some embodiments a NFT can include a silver alloy that includes both palladium and copper. In some embodiments, secondary elements such as copper, zirconium, zirconium oxide, platinum, aluminum, or gold may improve the corrosion resistance of Ag. Such alloys could have better environmental stability which can in turn improve the reliability of the NFT against possible acidic environments, which can be formed by decomposition of lubricants on the magnetic medium disk surface. Such secondary elements (those that improve corrosion resistance) can either be used as a second element in the alloy, or a third element in the alloy.

In some embodiments, a NFT can include silver that includes nanoparticles of a secondary element (or compound) instead of an alloy of silver with a secondary element. Exemplary materials that can be utilized in such embodiments can include for example oxides of V, Zr, Mg, calcium (Ca), Al, Ti, Si, cesium (Ce), yttrium (Y), Ta, W or thorium (Th), Co, or combinations thereof. Further exemplary materials that can be utilized in such embodiments can include for example nitrides of Ta, Al, Ti, Si, indium (In), Fe, Zr, Cu, W, boron (B), halfnium (Hf), or combinations thereof. In some embodiments, nanoparticles can be 5 nanometers (nm) or less in diameter. In some embodiments, the nanoparticles can be included at a level that is not greater than 5 atomic percent (at %) of the silver. A nanoparticle containing silver material can be fabricated using known methods, including for example reactive sputtering. For example, an Au film with oxide or nitride particles can be fabricating using either reactive co-sputtering in $O_2$ or $N_2$ from multiple targets of single elements or from reactive sputtering in $O_2$ or $N_2$ from a single target with the desired metal element mixing ratio.

Alloys useful in disclosed NFTs can be described by, for example, the atomic percent (at %) of the at least one secondary element. In some embodiments, a useful alloy can have from 3 at % to 30 at % of the at least one secondary element. In some embodiments, a useful alloy can have from 5 at % to 25 at % of the at least one secondary element. In some embodiments, a useful alloy can have from 5 at % to 15 at % of the at least one secondary element.

Silver alloys for use in disclosed NFTs can be fabricated using various methods, including for example sputtering from an alloy target; co-sputtering from multiple targets; reactive sputtering from an alloy target; reactive co-sputtering from multiple targets; co-evaporation from multiple sources; reactive co-evaporation from multiple sources; ion beam deposition from an alloy target; and electrochemical deposition.

A number of material properties may be useful in determining whether a particular alloy will be useful, and/or advantageous for use in a NFT. Such properties can include, for example plastic deformation, grain growth, stress relaxation and creep. Some of these properties have also been identified as the cause of various NFT failures. In some embodiments, silver alloys that can be useful in disclosed NFTs can show relatively high resistance to grain growth, relatively high resistance to stress relaxation, enhanced hardness, high thermal conductivity, improved corrosion resistance, or some combination thereof.

In some embodiments, useful NFT materials can have optical properties that enable efficient coupling of incident light to the surface plasmons and effective energy transfer to the magnetic medium. The optical properties of NFT materials are often characterized by their optical refractive index (n) and extinction coefficient (k) which can be measured by ellipsometry. From the n and k values, the real and imaginary part of the dielectric constant (permittivity) can be calculated by: $\in_1 = n^2 - k^2$ and $\in_2 = 2nk$. The plasmonic effect arises from the negative real part of the dielectric constant of the material. The strength of plasmonic coupling depends on the absolute value of $\in_1$. On the other hand, the surface plasmon mode needs to propagate over a substantial distance. The loss of this propagation is proportional to the imaginary part of the dielectric $\in_2$. A good plasmonic material will have high $|\in_1|$ and low $\in_2$. Hence a figure-of-merit (FOM) has been developed to characterize the "goodness" of plasmonic materials: $FOM = 3 * |\in_1 / \in_2|$.

The property of grain growth can be relevant to the ability of an alloy to function in a NFT. One of the sources for Ag deformation is its significant grain growth at high temperatures. By alloying Ag with other soluble metal atoms, the grain size of the Ag alloy can be reduced and the grain growth can be impeded. It is thought, but not relied upon that impeding grain growth can be the result of: a larger area of grain boundary that restrains the dislocation movement; and the localized strain fields by impurities that hinder the dislocation motion.

Thermal conductivity of an alloy can also be relevant to the ability of an alloy to function in a NFT. Silver (Ag) is known to have the highest thermal conductivity of all the metals. High thermal conductivity can be an important property for NFT materials since it may allow for effective heat transfer to an adjacent heat sink layer in order to reduce the temperature of the NFT during operation. Lower operating temperature of an NFT can provide a better environment for both the NFT material and the dielectric cladding materials, and may improve the long-term reliability of a HAMR head.

Corrosion resistance of a material may also be relevant to the ability of an alloy to function in a NFT. AgPd films can display much better environmental corrosion and/or tarnish resistance than a pure Ag film. An Ag film usually exhibits a less shiny surface after a few days in an atmospheric environment, while AgPd films do not show any degradation of surface reflectivity in air even after a few months.

The present disclosure is illustrated by the following examples. It is to be understood that the particular examples, assumptions, modeling, and procedures are to be interpreted broadly in accordance with the scope and spirit of the invention as set forth herein.

EXAMPLES

Example 1

Grain Stability of Ag Alloys

FIGS. 5A-5F show atomic force microscopy (AFM) images of films (scan size is 1 µm×1 µm). The films were deposited by DC magnetron sputtering. FIG. 5A is an as-deposited Ag film; FIG. 5B is an as-deposited AgPd (10.7 at % Pd) film; FIG. 5C is an as-deposited AgPd (25 at %) film; FIG. 5D is a Ag film after a 300° C. 15 minute rapid thermal annealing (RTA); FIG. 5E is a AgPd (10.7 at %) film after a 300° C. 15 minute rapid thermal annealing (RTA); and FIG. 5F is a AgPd (25 at %) film after a 300° C. 15 minute rapid thermal annealing (RTA). As seen in the figures, the as-deposited Ag film displays a large average grain size of about 150 nm, while AgPd films show a low average grain size of about 60 nm (FIGS. 5A, 5B, and 5C). After annealing the films at 300° C. for about 15 minutes, the average grain size of the Ag film increases significantly to about 300 nm while the AgPd films only show moderate grain growth (FIGS. 5D, 5E, and 5F). The figures show that increasing the Pd concentration in an AgPd alloy can improve its resistance to grain growth.

Example 2

Resistance of Ag to Plastic Deformation and Creep

The mechanical stability of silver upon annealing was tested by stress relaxation measurements where the thin film material was thermally cycled from room temperature to about 400° C. and back to room temperature. A Ag film was sputtered on a silicon (Si) substrate. As the film was heated up, the temperature was held at various setpoints, (for example about 100° C., about 150° C., about 200° C., about 250° C., and about 400° C.) for about 90 minutes and relative stress measurements were performed during this holding period at intervals of about 1 minute.

Figure 6A:
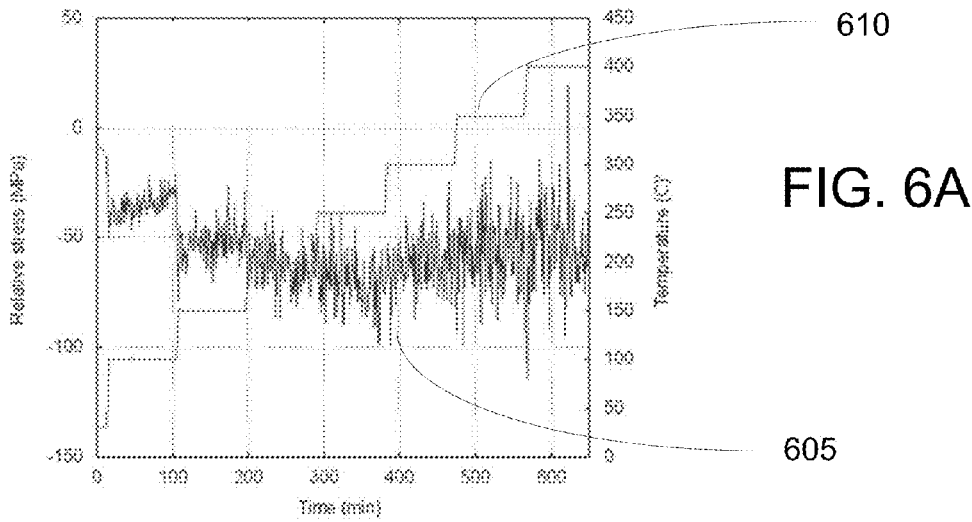
FIG. 6A shows a stress relaxation measurement of a silver (Ag) film versus time, as temperature increases from room temperature to about 400° C.

FIG. 6A shows the stress measurement as a function of time on the Ag film. The curve indicated as 605 in FIG. 6A is the relative stress of the Ag film and the curve indicated as 610 represents the temperature at each holding period. Due to different coefficients of thermal expansion of the substrate and the film, compressive stress developed in the Ag film when it was heated up. This is indicated by the negative stress relative to the stress at room temperature (seen in FIG. 6A). The initial drop of stress at the beginning of the temperature holding period and subsequent increase of stress as the holding time increases indicates a stress relaxation process in the film which is associated with creeping or plastic deformation of the material.

Figure 6B:
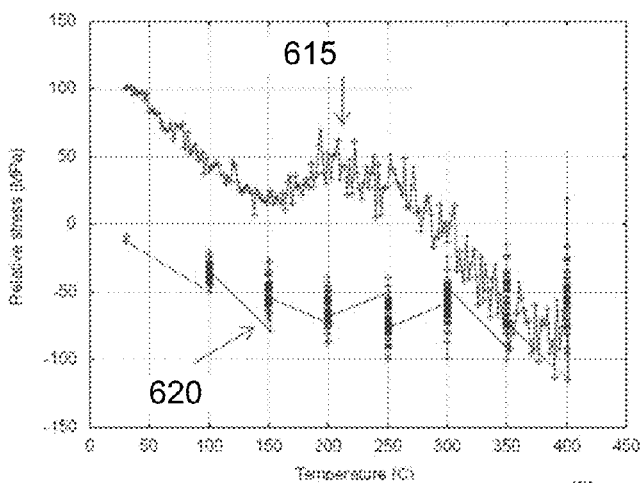
FIG. 6B shows a stress relaxation measurement of a silver (Ag) film versus temperature for both heating up and cooling down steps.

FIG. 6B shows the stress measurement as a function of temperature for both the heating up 620 and the cooling down 615 steps. A hysteretic behavior is seen between the heating and cooling curves in FIG. 6B, which further indicates plastic deformation in the Ag film.

Figure 6C:
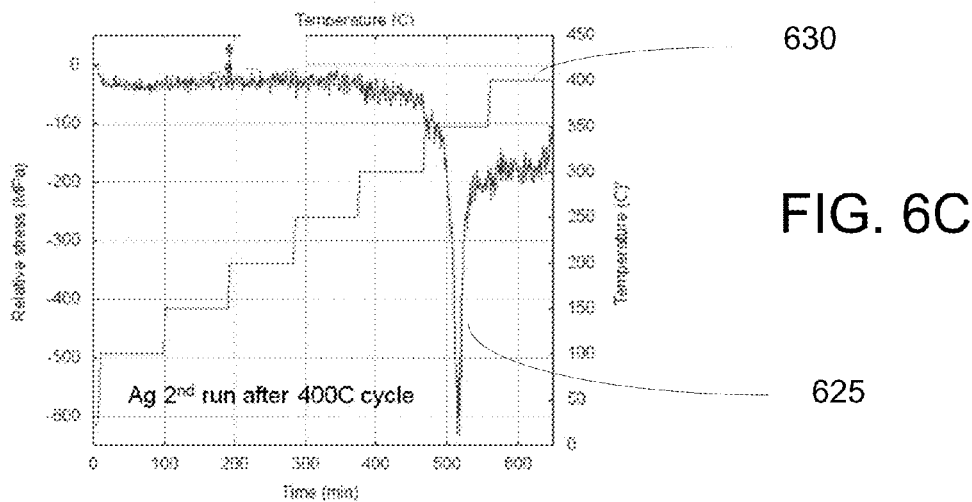
FIG. 6C shows a stress relaxation measurement of the same silver (Ag) film as FIG. 6A versus time, as temperature increases from room temperature to about 400° C. being run a second time.
Figure 6D:
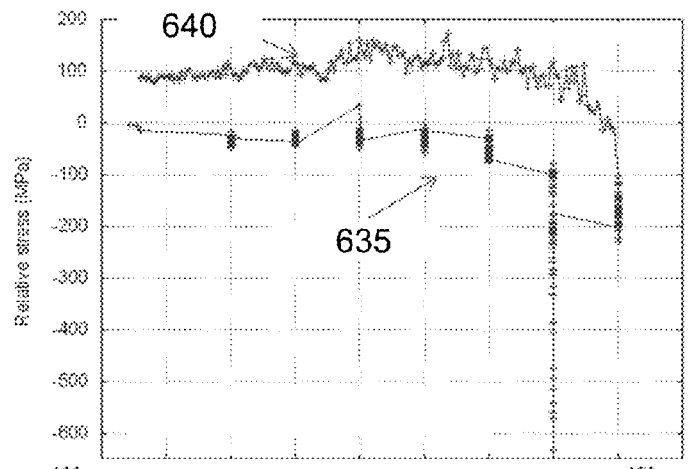
FIG. 6D shows a stress relaxation measurement of the same silver (Ag) film versus temperature for both heating up and cooling down steps being run a second time.

FIGS. 6C and 6D show the results of stress relaxation measurements on the same film for the second run. The curve indicated as 625 in FIG. 6C is the relative stress of the Ag film and the curve indicated as 630 represents the temperature at each holding period. FIG. 6D shows the stress measurement as a function of temperature for both the heating up 635 and the cooling down 640 steps. Because of the pre-annealing effect of the first measurement, the grain structure should be more stable than the as-grown film. However, even after pre-annealing up to about 400° C., the Ag film still shows similar stress relaxation as the as-grown film (FIGS. 6A and 6B), indicating plastic deformation in the film. Furthermore, a significant stress change occurred at about 350° C., suggesting chemical reaction of the film and structural change possibly due to film oxidation. As a result of grain growth, surface roughness change and chemical reaction, the Ag film after the thermal cycle showed a less shiny surface compared to its as-grown state.

Example 3

Resistance of Ag Alloys to Plastic Deformation and Creep

The mechanical stability of a AgPd film upon annealing was tested by stress relaxation measurements where the thin film material was thermally cycled from room temperature to about 400° C. and back to room temperature. A AgPd (5.8 at % Pd) film was sputtered on a silicon (Si) substrate. As the film was heated up, the temperature was held at various setpoints, (for example about 100° C., about 150° C., about 200° C., about 250° C., and about 400° C.) for about 90 minutes and relative stress measurements were performed during this holding period at intervals of about 1 minute.

Figure 7A:
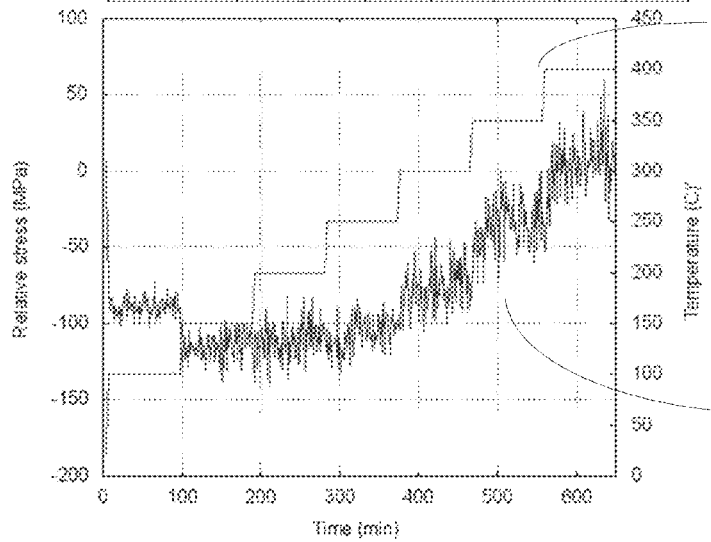
FIG. 7A shows a stress relaxation measurement of a AgPd film versus time, as temperature increases from room temperature to about 400° C.
Figure 7B:
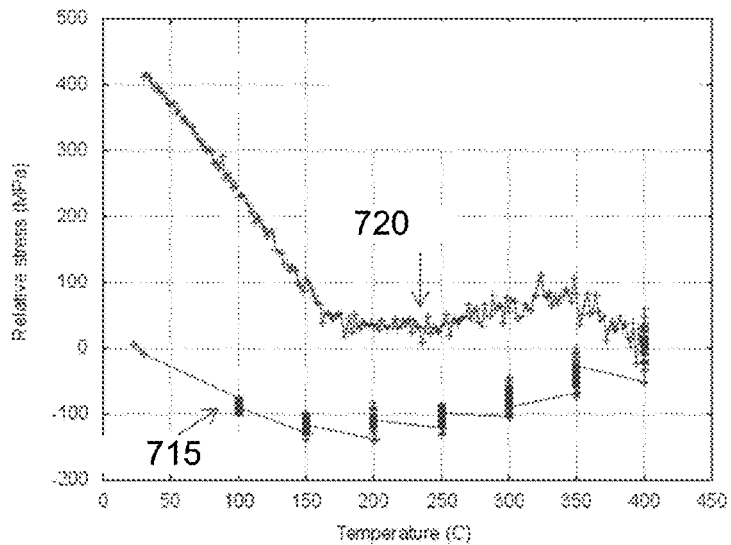
FIG. 7B shows a stress relaxation measurement of a AgPd film versus temperature for both heating up and cooling down steps.

FIG. 7A shows the stress measurement as a function of time on the AgPd film. FIG. 7A shows stress relaxation measurements of the AgPd (5.8 at % Pd) film versus time as the film is thermally cycled from room temperature to about 400° C. and back to room temperature. The curve indicated as 705 in FIG. 7A is the relative stress of the AgPd film and the curve indicated as 710 represents the temperature at each holding period. The stress relaxation does not happen until about 250° C., indicating improved resistance (relative to the Ag film) to plastic deformation. However, plastic deformation still occurred at an elevated temperature, as shown by the hysteretic curve of heating up 715 and cooling down 720 curve in FIG. 7B.

Figure 7C:
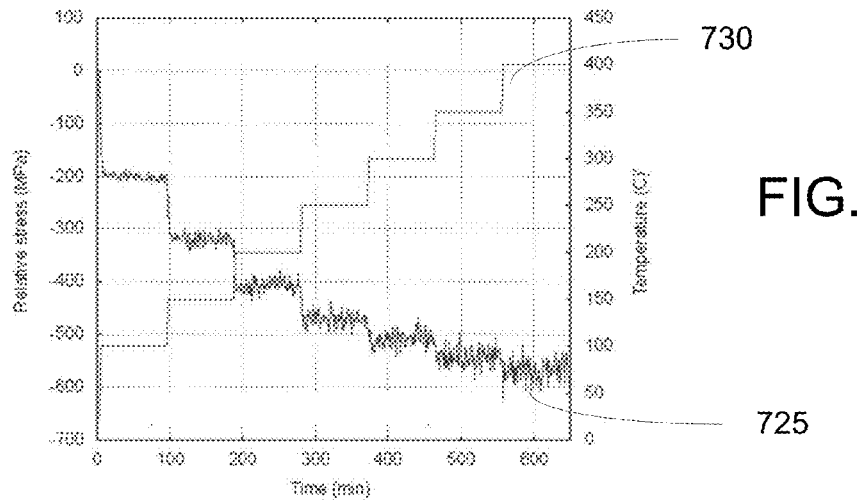
FIG. 7C shows a stress relaxation measurement of the same AgPd film as FIG. 6A versus time, as temperature increases from room temperature to about 400° C. being run a second time.
Figure 7D:
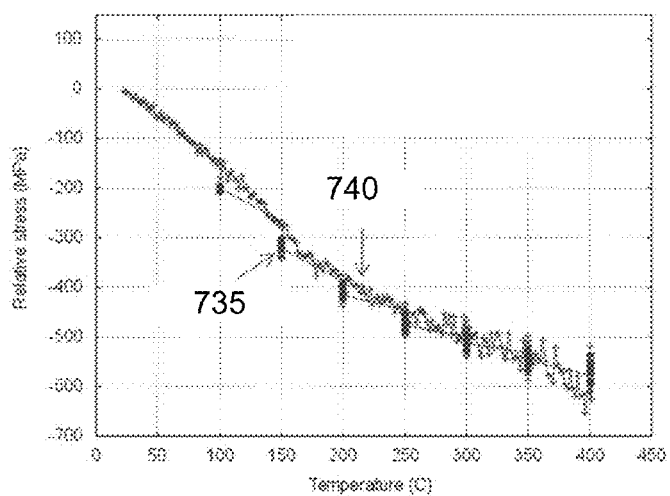
FIG. 7D shows a stress relaxation measurement of the same AgPd film versus temperature for both heating up and cooling down steps being run a second time.

FIGS. 7C and 7D show the results of stress relaxation measurements on the same film for the second run. The curve indicated as 725 in FIG. 7C is the relative stress of the Ag film and the curve indicated as 730 represents the temperature at each holding period. FIG. 7D shows the stress measurement as a function of temperature for both the heating up 735 and the cooling down 740 steps. When the AgPd film is subject to the second thermal cycle, the film shows much improved stability to creep and plastic deformation. FIGS. 7C and 7D show the results of stress relaxation measurement on the same AgPd film for the second run. Because of the pre-annealing effect of the first measurement, the AgPd film shows a more stable film structure in the second thermal cycle. The stress level is maintained for each temperature holding period as shown in FIG. 7C. The heating-up curve and cooling-down curves in FIG. 7D also overlap with a reversible stress change, which further demonstrates an enhanced resistance to creep and plastic deformation of the AgPd film after the pre-annealing treatment.

Example 4

Hardness of Ag Alloys

Figure 8:
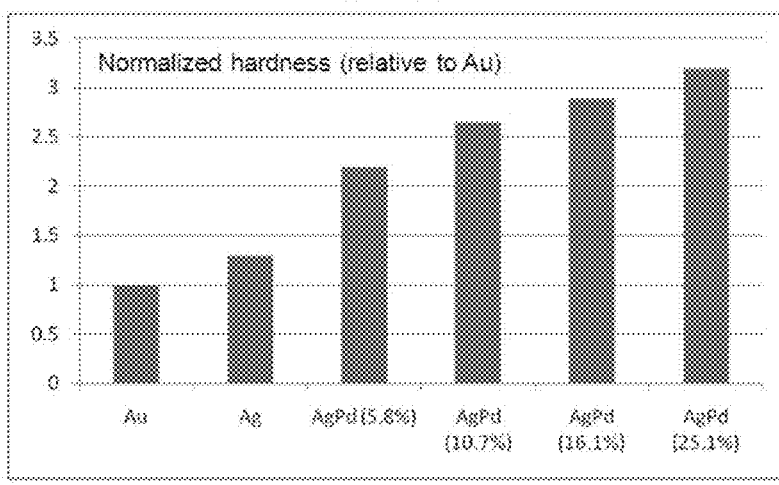
FIG. 8 shows the hardness of various films normalized to a gold (Au) film.

The hardness of various 150 nm films that were sputtered from two single element targets (Au, Ag, AgPd (5.8 at % Pd), AgPd (10.7 at % Pd), AgPd (16.1 at % Pd), and AgPd (25.1 at % Pd)) were tested using a nanoindentation technique. FIG. 8 shows the hardness of the films normalized to the Au film. FIG. 8 shows two- or three-fold increased hardness for AgPd alloys depending on the Pd concentration relative to Au. Increasing the amount of Pd, for example, can increase the hardness proportionally. Materials with higher hardness can be more resistant to plastic deformation and can have better long-term reliability.

Example 5

Optical Properties of Ag Alloys

Figure 9A:
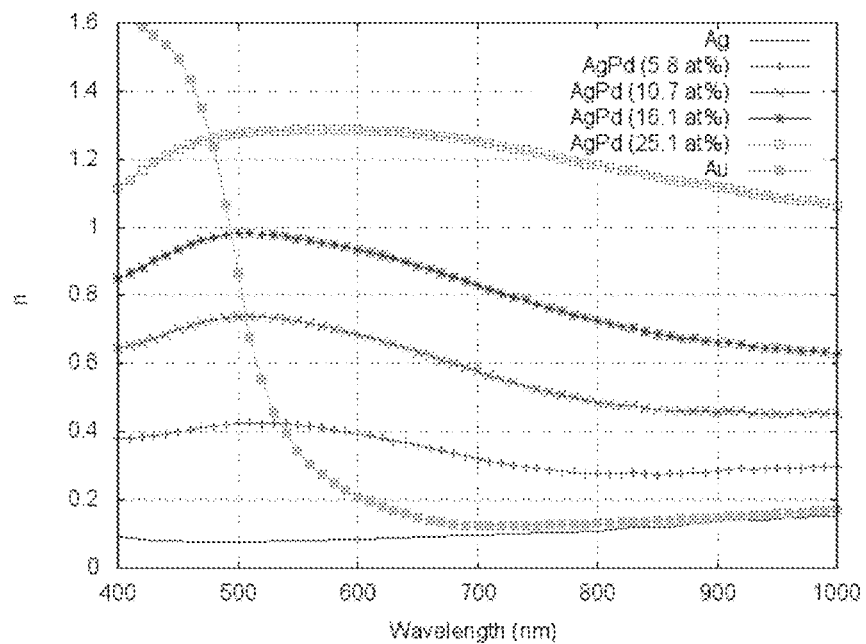
FIG. 9A shows the refractive index (n) of various materials as function of wavelength.
Figure 9B:
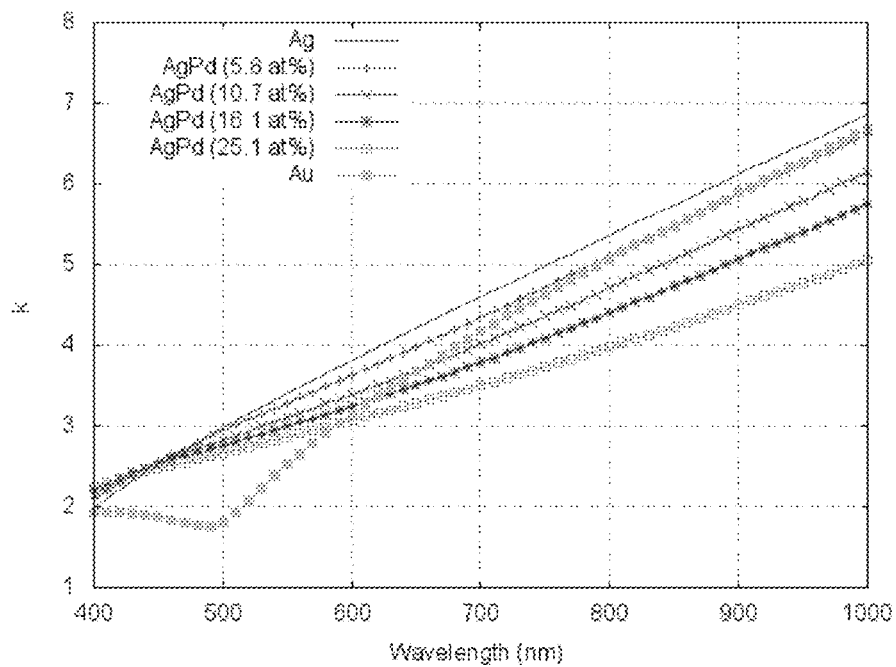
FIG. 9B shows the extinction coefficient (k) of various materials as function of wavelength.
Figure 9C:
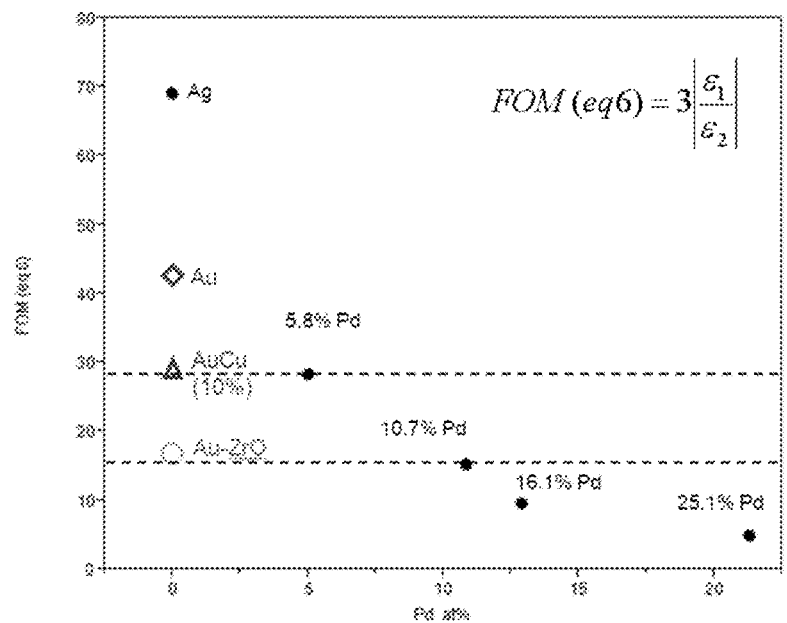
FIG. 9C shows the FOM (FOM=$3*|\epsilon_1/\epsilon_2|$, where $\epsilon_1=n^2-k^2$ and $\epsilon_2=2nk$) of various materials as function of wavelength.

FIG. 9A shows the refractive index (n) of various materials as function of wavelength, as measured with ellipsometry. Ag and Au showed the lowest values of n for wavelengths above about 700 nm. The n value of AgPd alloys show monotonic increases as the Pd concentration increases. FIG. 9B shows the extinction coefficient (k) of various materials as function of wavelength, measured with ellipsometry. The k value of AgPd alloys however, decrease monotonically with Pd concentration. FIG. 9C shows a comparison of the FOM (FOM=$3*|\epsilon E_1/\epsilon_2|$, where $\epsilon_1=n^2-k^2$ and $\epsilon_2=2nk$) for various materials (some are shown for comparison—Ag, Au, AuCu, and Au—ZrO). As seen there, Ag has the best optical properties for surface plasmon resonance, followed by Au, and followed by the AgPd alloys.

Example 6

Thermal Conductivity of Ag Alloys

Figure 10:
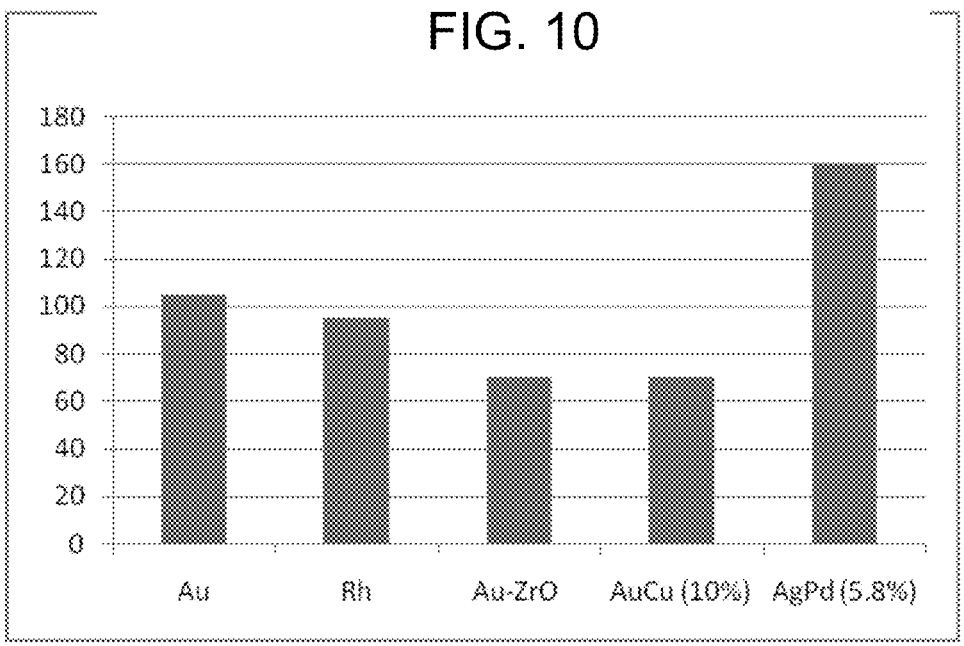
FIG. 10 shows the thermal conductivity (W/mK) of various materials.

FIG. 10 shows the thermal conductivity of a 100 nm thick film of AgPd (5.8 at % Pd) in comparison with other materials. AgPd (5.8 at % Pd) has the highest thermal conductivity, 160 W/m-k.

Example 7

Corrosion Resistance of Ag Alloys

To quantify the corrosion resistance of AgPd in solution, an electrochemical corrosion experiment was performed on AgPd films. The corrosion potentials ($E_{corr}$) and corrosion current densities ($I_{corr}$) were determined from potentiodynamic scans. An area of 1 cm$^2$ of film was exposed to NaCl 0.1M at pH 3 or 5.9 using a Princeton Applied Research Flat Cell. A Gamry potentiostat was used with the film. The working electrode was a saturated calomel (SCE) reference electrode, and the counter electrode was a Pt mesh. The scans were done at 1 mV/sec in the positive direction from −0.2V versus the open circuit potentials that were established by equilibrating the 1 cm$^2$ area of the films with NaCl 0.1M at pH 5.9 for 1200 sec or NaCl 0.1M at pH 3 for 300 sec before the scans. Table I shows the corrosion potential and corrosion current density comparison of Ag, AgPd (5.8 at % Pd) and AgPd (10.7 at % Pd) films in NaCl solutions at the two different pHs.

TABLE I

| | NaCl 0.1M pH + 5.9 | | | NaCl 0.1M pH = 3 | |
|---|---|---|---|---|---|
| Material | $E_{corr}$ (V vs. SCE) | $I_{corr}$ (μA/cm$^2$) | Material | $E_{corr}$ (V vs. SCE) | $I_{corr}$ (μA/cm$^2$) |
| Ag | −0.054 | 0.09 | Ag | −0.072 | 0.073 |
| AgPd (5 at % Pd) | −0.06 | 0.05 | AgPd (5 at % Pd) | −0.054 | 0.054 |
| AgPd (10 at % Pd) | −0.056 | 0.03 | AgPd (10 % Pd) | −0.03 | 0.025 |

As seen in Table I, in a pH of 5.9, the corrosion potentials are approximately the same. As the Pd content increases the corrosion current densities (corrosion rates) decrease. In a pH of 3, the corrosion potential slightly increases as the Pd content increases, the corrosion density is also seen to decrease with Pd concentration. Table II shows the Electrochemical Impedance Spectroscopy (EIS) scan of Ag and AgPd alloys in a NaCl solution having a pH=5.9. The test was done at the corrosion potential of each material. A much higher impedance was seen in AgPd alloys, which indicates better corrosion resistance for AgPd alloy.

TABLE II

| Material | Rp (M Ohm cm$^2$) |
|---|---|
| Ag | 0.24 |
| AgPd (5 at % Pd) | 1.2 |
| AgPd (10 at % Pd) | 2.1 |

It was found that although the current densities (corrosion rates) of Ag film are low, the Ag films tarnished after the corrosion test. In the case of AgPd, the films showed better resistance to the corrosion test. AgPd (5.8 at % Pd) showed some degree of tarnishing while AgPd (10.7 at % Pd) was still very shiny after the corrosion test. This further demonstrated the improved corrosion resistance and environmental stability of AgPd films compared to pure Ag films.

Thus, embodiments of optical devices including assist layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
a near field transducer, the near field transducer comprising an alloy, the alloy comprising silver (Ag) and from 3 atomic percent to 30 atomic percent of at least one other element or compound, wherein the at least one other element or compound is selected from:
magnesium (Mg), silicon (Si), or combinations thereof;
oxides of V, Zr, Mg, calcium (Ca), Al, Ti, Si, cesium (Ce), yttrium (Y), Ta, W or thorium (Th), Co, or combinations thereof; or
nitrides of Ta, Al, Ti, Si, indium (In), Fe, Zr, Cu, W, boron (B), halfnium (Hf), or combinations thereof.

2. The apparatus according to claim 1, wherein the near field transducer comprises an alloy, and the alloy comprises 5 atomic percent to 25 atomic percent of the at least one secondary element.

3. The apparatus according to claim 1, wherein the near field transducer comprises an alloy, and the alloy comprises 5 atomic percent to 15 atomic percent of the at least one secondary element.

4. The apparatus according to claim 1 further comprising an energy source.

5. An apparatus comprising:
a light source;
a waveguide; and
a near field transducer, the near field transducer comprises silver (Ag) and at least one other element or compound, wherein the at least one other element or compound is selected from:
palladium (Pd), gold (Au), iridium (Ir), or combinations thereof
wherein the at least one other element or compound is present from 10 atomic percent to 30 atomic percent,
wherein the light source, waveguide and near field transducer are configured to transmit light from the light source to the waveguide and finally the near field transducer.

6. The apparatus according to claim 5, wherein the near field transducer comprises an alloy of silver (Ag) and palladium (Pd).

7. The apparatus according to claim 5, wherein the near field transducer comprises an alloy of silver (Ag), palladium (Pd), and copper (Cu).

8. The apparatus according to claim 5, wherein the near field transducer comprises an alloy and the alloy comprises less than 25 atomic percent of the at least one secondary element.

9. The apparatus according to claim 5, wherein the near field transducer comprises an alloy and the alloy comprises less than 15 atomic percent of the at least one secondary element.

10. A disc drive comprising:
at least one actuator arm having a first and a second end;
at least one head, wherein each arm has a head at the first end thereof and wherein each head comprises:
a light source;
a near field transducer, the near field transducer comprising an alloy, the alloy comprising silver (Ag), and from 5 atomic percent to 15 atomic percent copper (Cu), and palladium (Pd);
a magnetic reader; and
a magnetic writer,
wherein the light source and the near field transducer are configured to transmit light from the light source to the near field transducer in order to assist the magnetic writer with writing.

* * * * *